United States Patent
Deiretsbacher et al.

(10) Patent No.: US 10,230,807 B2
(45) Date of Patent: Mar. 12, 2019

(54) METHOD AND APPARATUS FOR ENERGY-OPTIMIZED DATA TRANSMISSION USING THE OPC UA PROTOCOL IN RADIO NETWORKS

(71) Applicant: SIEMENS AKTIENGESELLSCHAFT, München (DE)

(72) Inventors: Karl-Heinz Deiretsbacher, Effeltrich (DE); Christian Hock, Fürth (DE); Gerald Kaefer, München (DE); Frank Volkmann, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 69 days.

(21) Appl. No.: 14/848,785

(22) Filed: Sep. 9, 2015

(65) Prior Publication Data

US 2016/0073443 A1    Mar. 10, 2016

(30) Foreign Application Priority Data

Sep. 10, 2014   (EP) .................................... 14184182

(51) Int. Cl.
*H04W 76/00*        (2018.01)
*H04L 29/08*        (2006.01)
(Continued)

(52) U.S. Cl.
CPC ............. *H04L 67/26* (2013.01); *H04L 67/02* (2013.01); *H04L 67/145* (2013.01); *H04L 67/42* (2013.01); *H04W 76/19* (2018.02)

(58) Field of Classification Search
CPC ...... H04W 76/028; H04L 67/42; H04L 67/26; H04L 67/02; H04L 67/145
See application file for complete search history.

(56) References Cited

U.S. PATENT DOCUMENTS

| 8,438,633 B1 * | 5/2013 | Backholm ............... G06Q 30/06 380/244 |
| 8,639,680 B1 * | 1/2014 | Ciccolo ............. G06F 17/30867 707/705 |

(Continued)

OTHER PUBLICATIONS

Aro, OPC UA Sessions, Subscriptions and Timeouts, PROSYS OPC Blog and Forum Jan. 26, 2012 (retreived from Internet on Jan. 28, 2017).*

(Continued)

*Primary Examiner* — Shailendra Kumar
(74) *Attorney, Agent, or Firm* — Henry M. Feiereisen LLC (57) ABSTRACT

A method and apparatus for energy-optimized data transmission by OPC UA protocol in radio networks is disclosed. When OPC UA communication is operated in a mobile device, e.g. as mobile access to part of a plant for maintenance, monitoring, parameterization, transmission is frequently implemented by the OPC UA's own request-response based communication behavior. Since the device is rarely able to switch off the transmitter, the battery of the device is very quickly discharged. This poses a problem, particularly in the case of devices that are intended to respond promptly to infrequent warnings or events. However, when a client device is intended to provide notification in relation to one event only, the previous polling, i.e. the periodic interrogation is dispensed with and an alternative notification through means inherent in the mobile network is used. This method uses, for example, a mobile push service supplied by the network provider.

20 Claims, 4 Drawing Sheets (51) Int. Cl.
*H04L 29/06* (2006.01)
*H04W 76/19* (2018.01)

(56) References Cited

U.S. PATENT DOCUMENTS

| | | | | |
|---|---|---|---|---|
| 2011/0185302 | A1* | 7/2011 | Kalapodas | G06F 3/0481 715/771 |
| 2013/0128786 | A1* | 5/2013 | Sultan | H04W 52/0238 370/311 |
| 2013/0265940 | A1* | 10/2013 | Su | H04L 67/2861 370/328 |
| 2014/0112226 | A1* | 4/2014 | Jafarian | H04W 52/0229 370/311 |
| 2015/0133049 | A1* | 5/2015 | Lee | H04W 4/003 455/41.1 |
| 2016/0014210 | A1* | 1/2016 | Thomas | H04L 67/02 709/227 |

OTHER PUBLICATIONS

Kendall et al., SPF-Net: A Scalable Protocol for Flexible Sensor Networks, IEEE Sarnoff Symposium, Apr. 12, 2010.*

Shrestha et al., An Optimized OPC UA Transport Profile to Bringing Bluetooth Low Energy Device into IP Networks, 18th IEEE Conference on Emerging Technologies & Factory Automation (ETFA), Sep. 10, 2013.*

Olov Schelen, 10th IEEE International Conference on Networking, Sensing and Control (ICNSC), Apr. 10, 2013.*

Wang et al, Transmitting IPv6 Packets over Bluetooth Low Energy based on BlueZ, 15th International Conference on Advanced Communications Technology (ICACT), Jan. 27-30, 2013.*

Gopinath Rao, S. et al.: A gateway solution for IPv6 wireless sensor networks; in: Ultra Modern Telecommunications&Workshops,2009. ICUMT '09. International Conference on, IEEE, Piscataway, NJ, USA; pp. 1-6; ISBN: 978-1-4244-3942-3; XP031574470.

Spiess, P. et al.: "Reliable execution of business processes on dynamic networks of service-enabled devices"; in: 2009 7th IEEE International Conference on Industrial Informatics, Piscataway, NJ, USA; pp. 533-538; ISBN: 978-1-4244-3759-7; XP031504298.

Aro et al.: "OPC UA Sessions, Subscriptions and Timeouts"; in: Prosys Blog and Forum; Gefunden im Internet URL:http://forum. prosysopc.com/2012/01/26/jouni/opc-ua-sessions-subscriptions-and-timeouts/.

Shrestha,Ganesh Man et al.: "An optimized OPC UA transport profile to bringing Bluetooth Low Energy Device into IP networks"; in: 2013 IEEE 18th Conference on Emerging Technologies & Factory Automation (ETFA), IEEE; pp. 1-5; ISSN: 1946-0740; DOI:10.1109/ETFA.2013.6648115; XP032517072;.

Delsing, Jerker et al.: "A migration approach towards a SOA-based next generation process control and monitoring"; in: IECON 2011—37th Annual Conference on IEEE Industrial Electronics Society, IEEE; pp. 4472-4477; ISBN: 978-1-61284-969-0; DOI: 10.1109/IECON.2011.6120045; XP032105167;.

Sch Elen, Olov et al.: "A Sensor-data Acquisition Grid Architecture"; in: 2013 IOTH IEEE International Conference on Networking, Sensing and Control (ICNSC); pp. 361-366; ISBN: 978-1-4673-5198-0; DOI: 10.1109/ICNSC.2013.6548764; XP032431480;.

Kendall, Francis Etb Al.: "SPF-Net: A scalable protocol for flexible sens networks"; SARNOFF Symposium, 2010 IEEE, IEEE, Piscataway, NJ, USA; pp. 1-5; ISBN: 978-1-4244-5592-8; XP031679307;.

* cited by examiner

METHOD AND APPARATUS FOR ENERGY-OPTIMIZED DATA TRANSMISSION USING THE OPC UA PROTOCOL IN RADIO NETWORKS

CROSS-REFERENCES TO RELATED APPLICATIONS

This application claims the priority of European Patent Application EP 14184182.5, filed Sep. 10, 2014, pursuant to 35 U.S.C. 119(a)-(d), the content of which is incorporated herein by reference in its entirety as if fully set forth herein.

BACKGROUND OF THE INVENTION

OPC UA (OPC Unified Architecture) is an industrial communication protocol of the OPC Foundation for vendor-independent exchange of machine data, particularly in process automation. OPC UA is a relatively new standard in which the original focus was not on the control of an industrial plant, but rather on standardized information exchange, in particular standardized information exchange between devices from different vendors.

OPC UA has now also been integrated directly into automation technology devices, thereby creating a need for consistent writing of their data. Automation technology plants need to exchange process information, such as process values, measurement values, parameters, control commands, between different devices. It is important that information be transmitted consistently and resiliently between them there. This is particularly important in the case of the devices' data-modifying calls (i.e. the writing of variables).

The OPC UA protocol is also capable of communicating via Internet connections. In the Internet, the prevailing arrangement requires that a client/server communication always be initiated by the client, i.e. only the client is permitted to send requests and the server may then reply to the client's request. However, this conflicts with automation plants' requirement that communication must be initiated by either of the communication partners at any time.

Figure 2:
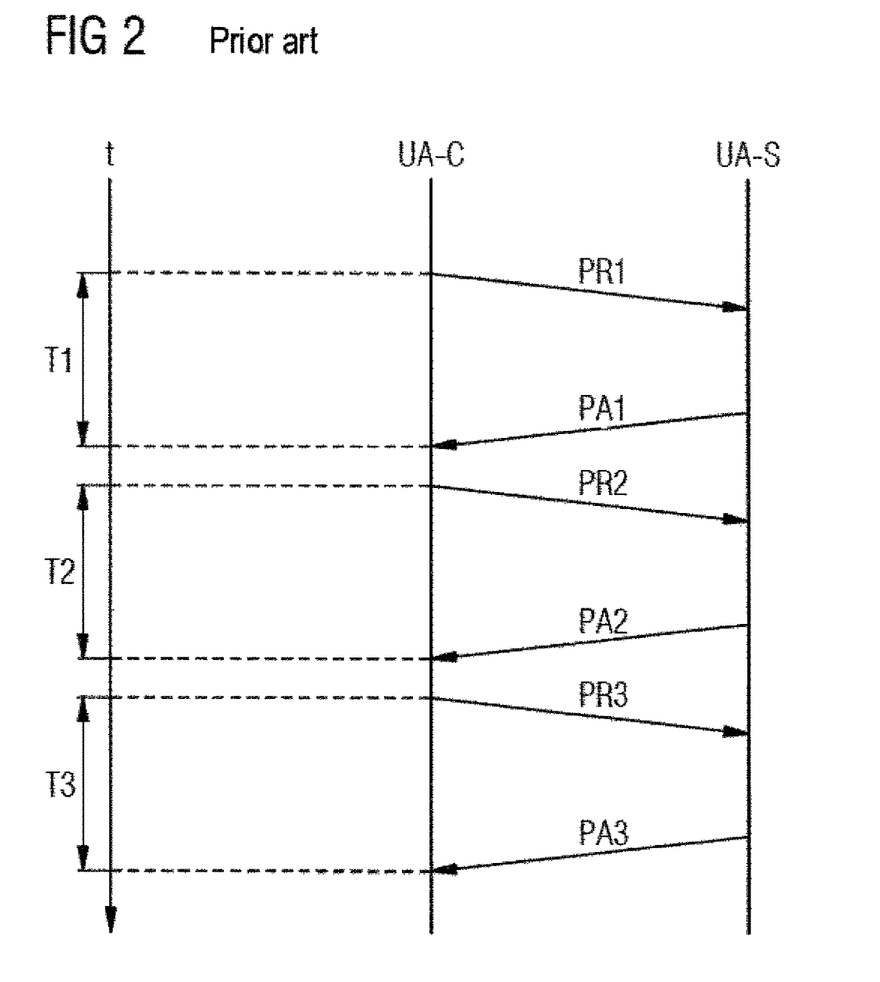
FIG. 2 shows the data exchange between the OPC UA client and an OPC UA server according to the prior art.

The OPC UA protocol currently solves this problem by already sending at least one request from the client to the server, even in advance of actually requesting data communication from the server, as is shown in FIG. 2. When the server (UA-S) wishes to send data to the client (UA-C), it can do this in accordance with the protocol as a response to one of these requests. These advance requests (PR1, PR2, PR3) are referred to as "Publish Requests" and the associated responses (PA1, PA2, PA3) as "Publish Responses". Up to three requests are normally retained. When the server has had no need to send data to the client for a long time, it sends an "empty" response, also referred to as a "Keep Alive" response. When the client receives a "Publish Response" to its "Publish Request", it sends a new request to the server.

This "Keep Alive" mechanism is necessary since the data traffic on the Internet is monitored by firewalls/proxies and similar network elements. These network elements clear down a connection when no data traffic has flowed via it for some time. Furthermore, this mechanism is also used to inform the communication partners of the correct function of the connection. With current means, a Keep Alive message must be dispatched every 10 seconds in order to keep the transmitter and receiver synchronized.

The spread of OPC UA and the use of cellphones and tablets for maintenance purposes are expected to only increase in future. Mobile devices communicate wirelessly using radio signals, such as wireless LAN, Bluetooth, 3G, and LTE, for example.

Since the mobile devices are normally powered by means of a battery and the energy requirements of the applications running on the device directly impact the running time of the device, their operation must be as energy-efficient as possible. The greatest energy consumption in mobile devices occurs in the transmission of messages. The transmitting antenna is therefore activated as little as possible. Reception, on the other hand, does not have a critical effect on the energy balance.

When OPC UA communication is used in a mobile device (e.g. as mobile access to part of a plant for the purposes of maintenance, monitoring, parameterization, etc.), transmission is frequently implemented by means of the OPC UA's own request-response based communication behavior. Since the mobile device is rarely able to switch off its transmitter, the battery of the device is very quickly discharged by this behavior. This poses a problem, particularly when the devices are required to respond promptly to infrequent warnings or events.

The situation of mobile communication was not taken into account in the definition of the OPC UA standard. Mobile terminals such as MOBIC, the MOBile Industrial Communicator, an industry-enabled mobile Internet Pad from Siemens for local and worldwide access to the Intranet and Internet using plug-in radio cards and wireless LAN, which is already used in plants today, communicate using other protocols.

Today, there is still no established solution to this problem. The spread of the use of OPC UA and the increasing use of mobile terminals for maintenance purposes are expected in future.

SUMMARY OF THE INVENTION

The invention provides a method and apparatus that overcome the problems described above and enable mobile terminals to use the OPC UA protocol.

In a method in accordance with the invention for communication between at least one client and at least one server of a client/server system using the OPC UA industrial communication protocol and having a Keep Alive mechanism in which a data connection existing between the server and the client is ended when no data packets are transmitted in a Keep Alive time period, permits only requests from at least one client and only responses thereto from at least one server, the client initially receives a first trigger message from the server, in response to which it sends out its request to the server.

An apparatus for carrying out the method described above accordingly comprises a transmitting device that transmits a trigger message to the client at the end of the Keep Alive period for the publication of data to be communicated.

The method is particularly advantageous when the planned communication from the server to the client is a transmission of a single OPC UA event notification. Then it is particularly evident that, when the client device does not have to permanently maintain a connection over which nothing is transmitted, except for the Keep Alive packets required from time to time, energy saving can be achieved, and therefore also an extension of the running time without needing to recharge the energy store.

It is advantageous that the underlying communication network is the Internet or a mobile network having a conventional mobile standard, GSM, GPRS, Edge, LTE, UMTS or HSPA in particular, for using current conventional mobile terminals. When the underlying communication network is the Internet, the HTTP protocol or the HTTPS Tunnel Protocol is advantageously used.

The invention is advantageously implemented using a push service provided by the underlying communication network. The communication can thus be implemented using a push service interface.

When the method is implemented using the OPC UA Republish mechanism for the repeated request of a data packet having a unique sequence number, then when the receipt of the data packet having this sequence number is not confirmed, a repeated request for the data packet is possible within the time period defined in the OPC UA until the requester rejects it.

The requirements of Web communication were taken into account in the communication mechanism of the OPC UA protocol described in the introduction by a mechanism based on the request-response behavior that is suitable for every application. However, this is not necessary for an OPC UA variant based on TCP/IP, for example.

The solution according to the invention then intervenes on the client and on the server side in the protocol layer. The upper layers of the OPC UA architecture remain unchanged, so that the method is transparently usable. The exchange in OPC UA uses the protocol layer, so that the invention is a standard-compliant extension of the OPC UA protocol.

For communication at short time intervals everything remains unchanged. However, when a client device is only used to provide notification in response to a single event, the previous polling, i.e. the periodic interrogation having proxy server timeout values of 10-30 seconds, is dispensed with and an alternative notification means inherent in the mobile network is used.

This method makes use of a mobile push service that the network provider already supplies, for example. This push service offers a service interface with which the OPC UA server notifies the client that it would like to address the client, a mobile terminal such as a Smartphone for example.

In the case of a mobile network using the GSM standard, for example, the GSM provider offers a mobile push service having a service interface for this purpose. When an OPC UA client is then to be woken up by an OPC UA server, the OPC UA server triggers a message to the OPC UA client using the push service interface. This is then implemented using a Hidden Text Message to the telephone number of the mobile terminal, for example. In this way, the client implementation thus ensures that a Hidden Message will awaken the OPC UA client. The client then retrieves the message or messages from the OPC UA server before it can put itself back to sleep again.

BRIEF DESCRIPTION OF THE DRAWING

Other features and advantages of the present invention will be more readily apparent upon reading the following description of a currently preferred exemplified embodiment of the invention with reference to the accompanying drawing, in which.

DETAILED DESCRIPTION OF PREFERRED EMBODIMENTS

Figure 1:
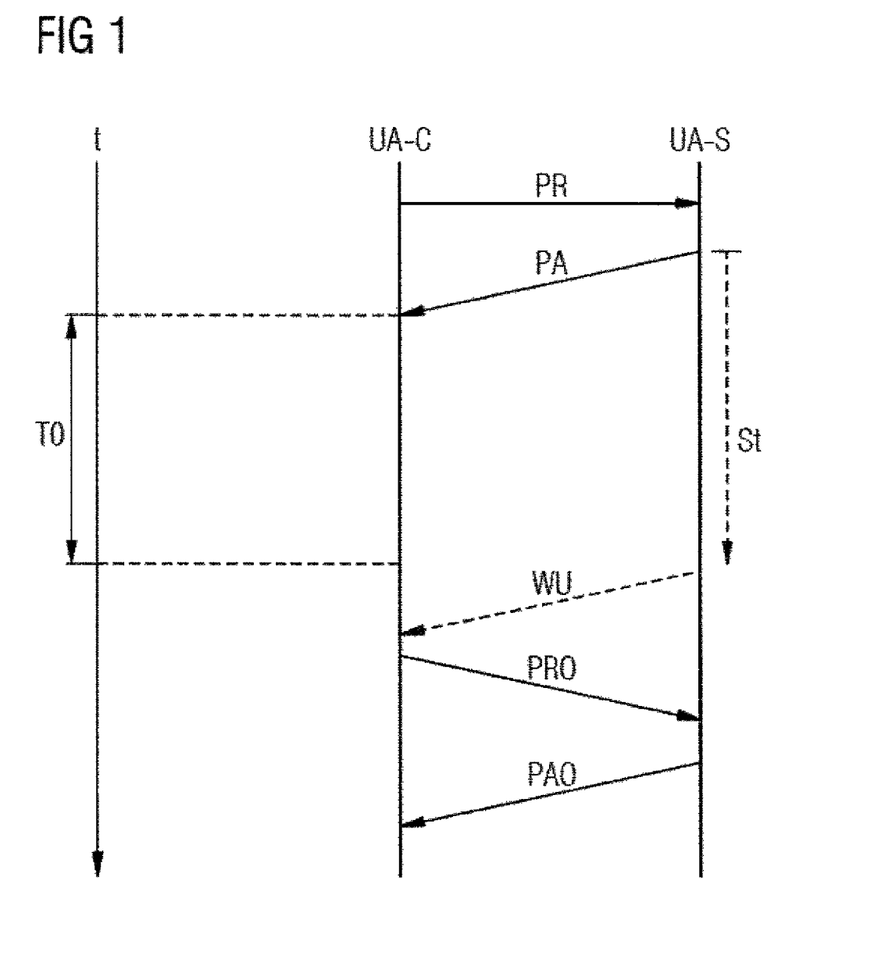
FIG. 1 shows the data exchange between the OPC UA client and an OPC UA server according to the invention.

An extension of the OPC UA protocol providing an event notification mechanism according to the invention is shown in FIG. 1 and contrasted with a conventional event notification mechanism that is provided by the OPC UA client, shown in FIG. 2. In FIG. 1, when the server (UA-S) wishes to transmit data to the client (UA-C), such as the fault data discussed below, can do this as a response to a request (PR) by the client. These requests (PR) the client are triggered according to the invention with a trigger message (WU) from the server (UA-S), particularly after an interval (St) when the Keep Alive time (T0) of the client (UA-C) has already been exceeded as shown in FIG. 1. Thus, in accordance with the invention, it is not necessary to keep the client constantly on standby for transmission and reception.

An example of an implementation could look like this: On the client side (UA-C) the publish requests (PR) are dismissed without response. On the server side (UA-S), it is always assumed that a query, Publish Request (PR), is available and that the corresponding reply, Publish Response (PA), is transmitted directly to the client (UA-C).

This new behavior can be negotiated transparently between the server and client when the connection is set up. This provides that, in the ideal case, after the data updates have been configured (OPC UA: CreateSubscription, etc.) the client actually no longer needs to activate its transmitter for data changes.

The OPC UA "Republish" mechanism, which is defined as optional in the OPC UA standard, can be used by the OPC UA client in accordance with the invention as follows: As shown in FIG. 2, each of the publish request data packets (PR) that are transmitted (OPC UA Notification Messages) are consecutively numbered with respective sequence numbers "x". The client's receipt-of those data packets (PRx) that were requested by the client is not confirmed, and the server's corresponding data messages to the client (PAx) expire at the end of a time period (Tx), as provided in the OPC UA standard. Using this "Republish" mechanism the OPC UA client can request a repetition (Republish) of the data packets, but it can only make this request in this time period (Tx) before the request message (PRx) expires. In the Republish request (PRx) the OPC UA client indicates the sequence number "x" of the data that needs to be retransmitted.

The Republish mechanism is not normally used by a mobile device. This is possible, but then the OPC UA client must activate its transmitter when it is to be used to republish.

Should the HTTPS Tunnel Protocol be used as the transmission protocol, the same applies as for OPC Binary, since the tunnel uses the same protocol. When HTTP is used as the transmission protocol, the Request-Response paradigm must be taken into account by HTTP. This is achieved by producing a single Publish Request in response to which a plurality of responses are transmitted by "Chunked Data Encoding". Under the HTTP protocol, this is treated as a single response.

When transmission monitoring takes place, a forced disconnection/reconnection must be provided at the HTTP level, oriented to the circumstances of the monitoring. The transmitter must be activated during the interval required for the monitoring and therefore, at least in terms of energy consumption, has a disadvantage in that case. However, in the context of automation technology plants, since there the infrastructure is under control, it normally has no impact.

The method is preferably used to implement an energy-efficient response to events that typically have a low communication frequency.

OPC UA is not based on a request mechanism that uses "polling" communication but, rather, implements a complete "Callback Interface". This callback can be transparently implemented in accordance with the invention for energy-efficient mobile notification of events that typically have a low communication frequency through intelligent integration in the communication stack of the mobile client, and with the help of a corresponding push service interface (GW) on the server side.

The life span of a session is normally very long, therefore it is advantageous when the connection (http/TCP connection) is re-established on demand. This action is implemented transparently for the application.

The implementation of the Server Push Pattern is described below by way of example, as well as the representation in FIG. 1 and FIG. 3.

When the OPC UA client UA-C sends a request, the PRO Publish Request; the OPC UA stack on the client side consisting of the Client APP (C-APP), OP UA Client API (C-API), IP Socket Layer (IP SL), buffers this request. For an event, the OPC UA server UA-S sends a trigger message, the WU Wake-up Message, with the Publish Response information, to the client device. The OPC UA Client Protocol Stack in the client device UA-C then sends the server UA-S the buffered Publish Request (PRO) and server UA-S sends its response (PA-0), the Publish Response, to the client UA-C, as shown in FIG. 1.

Figure 3:
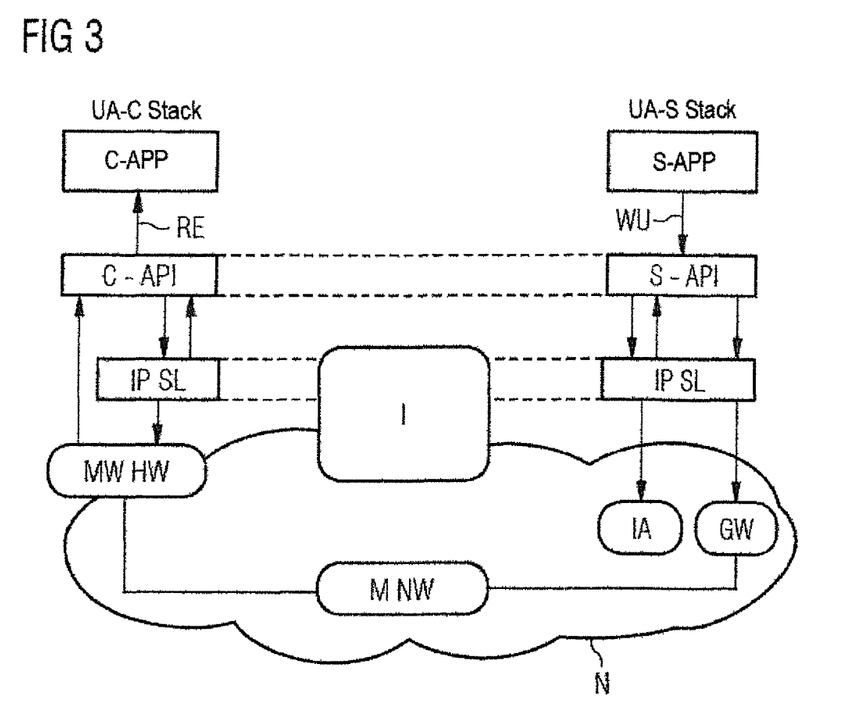
FIG. 3 shows an example of a network structure having devices in accordance with the invention.

An example of an advantageous embodiment of application software (C-APP, S-APP) in accordance with the invention that provides an extension of the OPC UA protocol is shown in FIG. 3. This embodiment, uses the OPC UA "Republish" trigger (RE) of the mobile client (C-APP) of the mobile device (MW HW) in FIG. 3, which ought to be used only for fault notification, described below. In the event that a fault notification is received from the communication-stack (UA-S) of the server, this OPC UA-based embodiment enables the mobile user (UA-C) to access and use the fault data immediately over the mobile data network (M NW) in an energy-efficient manner, as noted above.

Figure 4A:
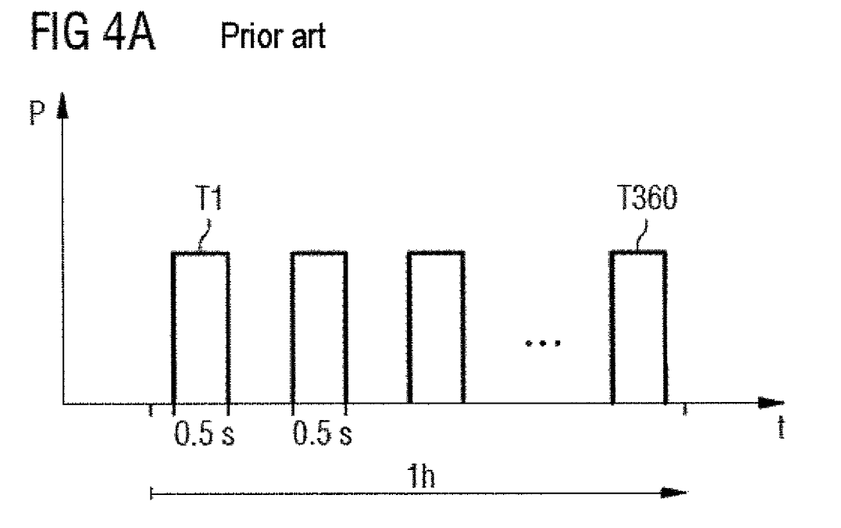
FIG. 4A shows a calculation of the energy consumption according to the prior art.

The communication runs via the Internet (I) and/or a mobile network (M NW). The following boundary conditions apply: The proxy "Keep Alive" cycle in the network lasts 10 seconds and just a few, two to three events on average, are transmitted per day. The antenna part is deactivated after 500 milliseconds. Extrapolations relating to the energy requirements of client devices such as those shown in FIGS. 4A and 4B, follow:

Using conventional fault notification, FIG. 4A:

The client must ask the server 360 times per hour to check whether there are any new messages. Otherwise, the proxy server will end the session and the client will have to again set up a complete session. This results in active energy consumption during times T1 to T360 in each hour, in addition to Idle Energy. Thus 24 * 360 =8640 requests must be transmitted per day. For each request, the antenna part is activated for at least 0.5 seconds. The resulting active antenna time is then at least: 8640 * 0.5 seconds =4320 seconds =72 minutes per day.

Figure 4B:
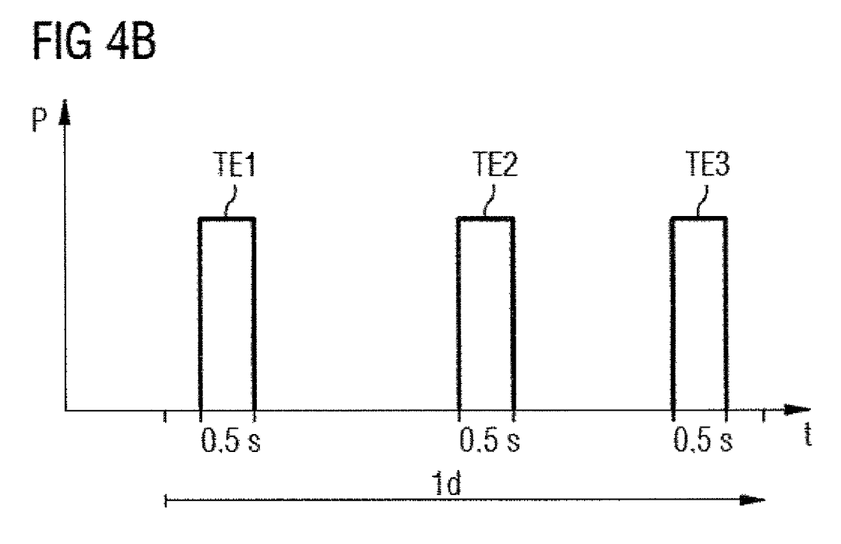
FIG. 4B shows a calculation of the energy consumption in accordance with the present invention.

In contrast, in the proposed fault notification in FIG. 4B:

The 3 events produce 3 wake-up activities TE1, TE2, TE3 per day. The active antenna time is therefore: 3 * 0.5 second =1.5 seconds per day. As a result, a considerable saving potential is evidently possible. The expected extension of the battery running time of a mobile terminal is in the order of factors.

When the OPC UA protocol is used without change on a mobile terminal, for example, or a comparable device having an energy store, heavy power consumption is to be expected, i.e. hours of running time for the device, since the transmitter is more or less constantly activated, as described above.

The OPC UA protocol makes no provision for minimizing transmission time when mobile devices are used as the client. The method described here enables a considerable energy saving with minimal intervention in the communication architecture of OPC UA. This guarantees that unwanted side-effects due to changes in its behavior are more or less excluded. The method can be implemented as an extension of the standard, so that both communication partners continue to behave in a manner that is standard-compliant (and therefore compatible with third-party devices). A further positive effect is that the operation of the server and client can be significantly simplified, since the entire Keep Alive operation is eliminated.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A method of providing unscheduled fault notifications to a mobile client device from a server in an industrial client/server system, in addition to the fault notifications the server provides to industrial client devices, using fault notification information that identifies the fault notification that the mobile client device must request from the server, said industrial client/server system using an industrial monitoring protocol wherein industrial client devices continually send keep alive messages to the server that are required to enable the industrial client devices to receive unscheduled fault notifications from the server, said method supporting industrial maintenance by promptly and reliably providing fault notifications to the mobile client devices that are adapted to use at least one network external to the industrial client/server system and do not send said keep alive messages to the server, said method comprising the steps of:

transmitting a trigger message providing notification information to the mobile client device, transmission of said trigger message being initiated by an extension of the industrial protocol used by the server when the server has a fault notification to provide to the mobile client, and initiating the transmission of a request by the mobile client to the server in response to the trigger message initiated by the server, using the notification information in the trigger message transmitted to the mobile client and an extension of the industrial monitoring protocol that is used by the industrial client, whereby unscheduled fault notifications provided by the industrial monitoring protocol are provided promptly and reliably to mobile devices in accordance with the server's extended industrial monitoring protocol.

2. The method of claim 1, wherein the communication transmitted by the server to the client in response to the request transmitted by the client is a single OPC UA event notification.

3. The method of claim 1, wherein the client/server system includes the Internet.

4. The method of claim 1, wherein a mobile network using a conventional mobile communication standard connects the client device to the client/server system.

5. The method of claim 4, wherein the client/server system a mobile network uses a mobile communication standard that is one of the following: GSM, GPRS, Edge, LTE, UMTS, or HSPA.

6. The method of claim 1, wherein the method is implemented using the HTTP protocol or the HTTPS Tunnel Protocol.

7. The method of claim 1, wherein the method is implemented using a push service.

8. The method of claim 1, wherein the method is implemented using a push service interface.

9. The method of claim 1, wherein the trigger message is sent as a Hidden Text message.

10. The method of claim 1, wherein the OPC UA Republish mechanism is used to implement a request for a data packet having a given unique sequence number, further comprising the step of repeatedly transmitting the request for the data packet having the given sequence number within the time period defined in the OPC UA when a confirmation of the receipt of the data packet having the given sequence number has not occurred, until the data packet is rejected by the requester.

11. The method of claim 1, wherein the network client/server system has multiple clients in a technical plant, each client monitoring the state of a respective technical component of the plant.

12. The method of claim 1, wherein a plurality of responses are transmitted by the server as a single response by using "Chunked Data Encoding" in response to a single request from the client.

13. The method of claim 1, further comprising the step of modifying the communication protocol of the client so that the client sends a request to the server in response to the trigger message received from the server that corresponds to the trigger message.

14. The method of claim 1, wherein the notification information in the trigger message transmitted by the server to the mobile client provides a buffered OPC UA Publish Request from the mobile client, and the communication transmitted by the server to the mobile client in response to the Publish Request transmitted by the mobile client is a corresponding Publish Response.

15. Network apparatus adapted to transmit unscheduled fault notifications to mobile client devices from a server device in an industrial client/server system, in addition to the fault notifications the server provides to industrial client devices, using fault notification information that identifies the fault notification that the mobile client device must request from the server, said industrial client/server system using an industrial monitoring protocol wherein industrial client devices receive unscheduled fault notifications from the server by continually sending keep alive messages to the server that are required to enable the industrial client devices to receive unscheduled fault notifications from the server, said network apparatus further supporting industrial maintenance by promptly and reliably providing fault notification information identifying the fault notification that must request from the server to mobile client devices, said mobile client devices using at least one network external to the industrial client/server system and not sending keep alive messages to the server, said network apparatus comprising;

a trigger transmitter, said trigger transmitter being adapted to transmit a trigger message to a mobile client device, said trigger message providing fault notification information to the mobile client device when the server has a fault notification to transmit to the mobile client device; and a protocol extension of the industrial monitoring protocol in the communication protocol stack in the memory of the server, said protocol extension initiating transmission of the trigger message by the trigger transmitter, said trigger message providing notification information to said mobile client device when the server has a fault notification to transmit to the mobile client device, whereby the unscheduled fault notifications of the industrial monitoring protocol are provided promptly and reliably to mobile client devices as well as to the industrial client devices, without the mobile client device continually sending keep alive messages to the server in accordance with the industrial monitoring protocol.

16. The network apparatus of claim 15, wherein the network is in a technical plant and has multiple client devices monitoring the state of technical components of the plant, the network apparatus being adapted to transmit the trigger message to a respective client device monitoring the state of a respective one of the technical components of the plant where the fault occurred.

17. The network apparatus of claim 15 having a protocol stack that has been modified by the protocol extension in the memory of the network apparatus to transmit the trigger message to a conventional Internet-enabled mobile device so that the mobile device sends a request to the server in response to the trigger message received from the server.

18. A mobile client device adapted to obtain unscheduled fault notifications from a server device in an industrial client/server system, in addition to the fault notifications the server provides to industrial client devices, using fault notification information that identifies the fault notification that the mobile client device must request from the server, said industrial client/server system using an industrial monitoring protocol wherein industrial client devices continually send keep alive messages to the server that are required to enable the industrial client devices to receive unscheduled fault notifications from the server, said mobile client device further supporting industrial maintenance by also promptly and reliably providing the fault notifications provided by the industrial client devices, said mobile client devices using at least one network external to the client/server system and not sending keep alive messages to the server, said mobile client device comprising:

a trigger receiver in the mobile client device adapted to receive a trigger message transmitted by the server, said trigger message providing fault notification information to the mobile client device when the server has a fault notification to transmit to the mobile client device; and a protocol extension of the industrial monitoring protocol in the protocol stack in the memory of the mobile client device, said extension of the industrial monitoring protocol initiating transmission of a data request by the mobile client device to the server in response to the notification information in the trigger message received by the mobile client device, whereby the unscheduled fault notifications provided to the industrial client devices by the industrial monitoring protocol are also provided promptly and reliably to mobile client devices, in accordance with the extended industrial monitoring protocol in the protocol stack in the memory of the mobile client device.

19. The mobile client device of claim 18, wherein the mobile client device is energy-autonomous.

20. The mobile client device of claim 18, wherein the client device is a conventional Internet-enabled mobile device having a protocol layer that has been modified so that the client sends and the protocol extension initiates the transmission of an OPC UA request to the server in response to the trigger message received from the server.

\* \* \* \* \*